(12) United States Patent
Bito (10) Patent No.: US 10,583,716 B2
(45) Date of Patent: Mar. 10, 2020

(54) EXTERIOR STRUCTURE OF VEHICLE DOOR

(71) Applicant: SHIROKI CORPORATION, Fujisawa-shi, Kanagawa (JP)

(72) Inventor: Takayasu Bito, Toyokawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 61 days.

(21) Appl. No.: 15/884,627

(22) Filed: Jan. 31, 2018

(65) Prior Publication Data
US 2018/0229590 A1 Aug. 16, 2018

(30) Foreign Application Priority Data

Feb. 16, 2017 (JP) .................................. 2017-026736

(51) Int. Cl.
*B60J 5/04* (2006.01)
*B60J 10/30* (2016.01)
*B60J 10/74* (2016.01)

(52) U.S. Cl.
CPC ........... *B60J 5/0463* (2013.01); *B60J 5/0402* (2013.01); *B60J 10/30* (2016.02); *B60J 10/74* (2016.02)

(58) Field of Classification Search
CPC ........ B60J 5/0463; B60J 5/0402; B60J 10/30; B60J 10/74
USPC .................. 49/502, 372, 374, 376, 377, 378
See application file for complete search history.

(56) References Cited

U.S. PATENT DOCUMENTS

| 7,152,373 | B2 * | 12/2006 | Hoffman | ............... B60J 5/0402 49/502 |
| 7,806,462 | B2 * | 10/2010 | Horneck | ............... B60J 5/0404 296/146.2 |
| 8,127,501 | B2 | 3/2012 | Nakao et al. | |
| 8,317,253 | B2 * | 11/2012 | Sachdev | ............... B60J 5/0405 296/146.2 |
| 9,132,720 | B2 * | 9/2015 | Yokota | ................... B60J 5/0408 |
| 9,566,850 | B2 * | 2/2017 | Inai | ......................... B60J 10/84 |

(Continued)

FOREIGN PATENT DOCUMENTS

| JP | 01297320 A | * | 11/1989 |
| JP | 02162120 A | * | 6/1990 |

(Continued)

*Primary Examiner* — Jerry E Redman
(74) *Attorney, Agent, or Firm* — Buchanan Ingersoll & Rooney PC (57) ABSTRACT

Provided is an exterior structure of a vehicle door that includes a first exterior member and a second exterior member which are attached to the vehicle door and overlap each other as viewed from the vehicle exterior side. The first exterior member creates a clearance between the vehicle door and a portion of the first exterior member which overlaps the second exterior member. The vehicle door exterior structure is provided at the overlapping portions between the first exterior member and the second exterior member with an alignment portion which determines the position of the first exterior member in the vehicle interior and exterior directions via the second exterior member. The alignment portion makes it possible to properly align the overlapping portions of the two exterior members in the vehicle interior and exterior directions, thus making it possible to raise the quality of the vehicle door exterior structure.

7 Claims, 8 Drawing Sheets

(56) References Cited

U.S. PATENT DOCUMENTS

| | | | | |
|---|---|---|---|---|
| 2007/0084130 A1* | 4/2007 | Gaustad | ............... | B60J 1/17 |
| | | | | 49/502 |
| 2007/0261313 A1* | 11/2007 | Ruppert | ............... | B60J 5/0406 |
| | | | | 49/502 |
| 2009/0145043 A1* | 6/2009 | Yamashita | ............... | B60J 5/0402 |
| | | | | 49/502 |
| 2010/0123336 A1* | 5/2010 | Eckart | ............... | B60J 1/10 |
| | | | | 296/201 |
| 2011/0302846 A1* | 12/2011 | Okada | ............... | B60J 5/0408 |
| | | | | 49/502 |
| 2013/0160374 A1* | 6/2013 | Kuwabara | ............... | E05D 15/165 |
| | | | | 49/440 |
| 2014/0059942 A1* | 3/2014 | Goto | ............... | E06B 9/42 |
| | | | | 49/502 |
| 2014/0217773 A1* | 8/2014 | Shimizu | ............... | B60J 5/0402 |
| | | | | 296/146.6 |
| 2015/0165880 A1* | 6/2015 | Mass | ............... | B60J 10/18 |
| | | | | 49/490.1 |
| 2015/0202948 A1* | 7/2015 | Saiki | ............... | B60R 13/04 |
| | | | | 49/502 |
| 2016/0114658 A1* | 4/2016 | Yokota | ............... | B60J 10/45 |
| | | | | 49/489.1 |
| 2016/0176269 A1* | 6/2016 | Alhof | ............... | B60J 5/0402 |
| | | | | 49/502 |
| 2017/0096053 A1* | 4/2017 | Faust | ............... | B60J 5/0402 |
| 2019/0061487 A1* | 2/2019 | Kleinhoffer | ............... | B60J 5/0411 |

FOREIGN PATENT DOCUMENTS

| | | | |
|---|---|---|---|
| JP | 03208726 A | * | 9/1991 |
| JP | 04071924 A | * | 3/1992 |
| JP | 04081323 A | * | 3/1992 |
| JP | 2008-265400 A | | 11/2008 |

* cited by examiner

EXTERIOR STRUCTURE OF VEHICLE DOOR

BACKGROUND OF THE INVENTION

1. Field of the Invention

The present invention relates to an exterior structure of a vehicle door.

2. Description of the Related Art

Exterior parts such as decorative and protective moldings are attached to a vehicle door to protect edges of a door panel and a door frame and enhance the appearance thereof.

Specifically, beltline moldings, frame moldings, upper-sash moldings, garnish moldings, etc. are known as such exterior parts of the vehicle door. The beltline molding is attached to a door panel along a beltline on the upper edge of the door panel. The frame molding extends in a direction along a door frame from either the front end of a beltline on a front vehicle door or the rear end of a beltline on a rear vehicle door. The garnish molding is attached to an upright pillar sash that constitutes a pillar of a door frame. Japanese Unexamined Patent Publication No. 2008-265400 discloses such vehicle door moldings.

These types of exterior parts are separately formed as long members and attached to a door panel or a door frame. In addition, these exterior parts are often disposed in a manner such that two exterior parts overlap each other at a corner of a vehicle door (e.g., at a joint between a door panel and a door frame or between the upper sash and the upright pillar sash of a door frame) as viewed from the vehicle exterior side. However, due to structural constraints, there is a gap between a door body (a door panel and a door frame) and the exterior parts at a corner of a vehicle door, which sometimes makes it difficult to make the exterior part(s) firmly supported. Hence, there is a possibility of the overlapping portions of the two exterior parts not being precisely aligned, which may deteriorate the appearance and cause the exterior parts to create vibrations and noise due to wind pressure at the time of traveling.

SUMMARY OF THE INVENTION

The present invention provides a high-quality exterior structure of a vehicle door which makes it possible for two exterior parts to be properly mated.

According to an aspect of the present invention, an exterior structure of a vehicle door is provided, which includes a first exterior member and a second exterior member which are attached to the vehicle door and overlap each other as viewed from a vehicle exterior side. The first exterior member creates a clearance between the vehicle door and a portion of the first exterior member which overlaps the second exterior member. The first exterior member and the second exterior member include an alignment portion which determines a position of the first exterior member in vehicle interior and exterior directions via the second exterior member. The alignment portion is provided at the overlapping portions between the first exterior member and the second exterior member.

It is desirable that the alignment portion further determines a position of the first exterior member relative to the second exterior member in vehicle upward and downward directions.

It is desirable that the alignment portion includes a first mating portion and a second mating portion which limit the position of the first exterior member in one and the other of the vehicle interior and exterior directions, respectively. The first exterior member includes a body portion and an end cap which covers an end surface of the body portion. The end cap includes a lid portion, which comes in contact with the end surface of the body portion, and an insertion portion, which projects from the lid portion and is inserted into the body portion. The first mating portion comprises an extension portion which extends from the lid portion in the vehicle external side direction to face the second exterior member in the vehicle interior and exterior directions.

It is desirable that one of the first exterior member and the second exterior member resiliently abuts against the other of the first exterior member and the second exterior member at the second mating portion.

In an embodiment of the first mating portion, the extension portion of the first exterior member is provided with an insertion hole which extends through the extension portion in vehicle upward and downward directions. The second exterior member includes a body portion and an end cap which covers an end surface of the body portion of the second exterior member. The end cap of the second exterior member is provided with a downward projecting portion which projects downward and is inserted in the insertion hole.

In another embodiment of the first mating portion, the extension portion of the first exterior member is provided with an upright wall which projects upward. The second exterior member includes a body portion and an end cap which covers an end surface of the body portion of the second exterior member. The end cap of the second exterior member is provided with a downward projecting portion which projects downward. The downward projecting portion and the upright wall are positioned to face each other in the vehicle interior and exterior directions.

In the vehicle door exterior structure that is devised according to the present invention, the overlapping portions of the first exterior member and the second exterior member can be properly aligned in the vehicle interior and exterior directions by the alignment portion, which makes it possible to achieve a high-quality vehicle door exterior structure.

The present disclosure relates to subject matter contained in Japanese Patent Application No. 2017-026736 (filed on Feb. 16, 2017) which is expressly incorporated herein by reference in its entirety.

BRIEF DESCRIPTION OF DRAWINGS

The present invention will be discussed below in detail with reference to the accompanying drawings, in which.

DESCRIPTION OF THE EMBODIMENTS

Figure 1:
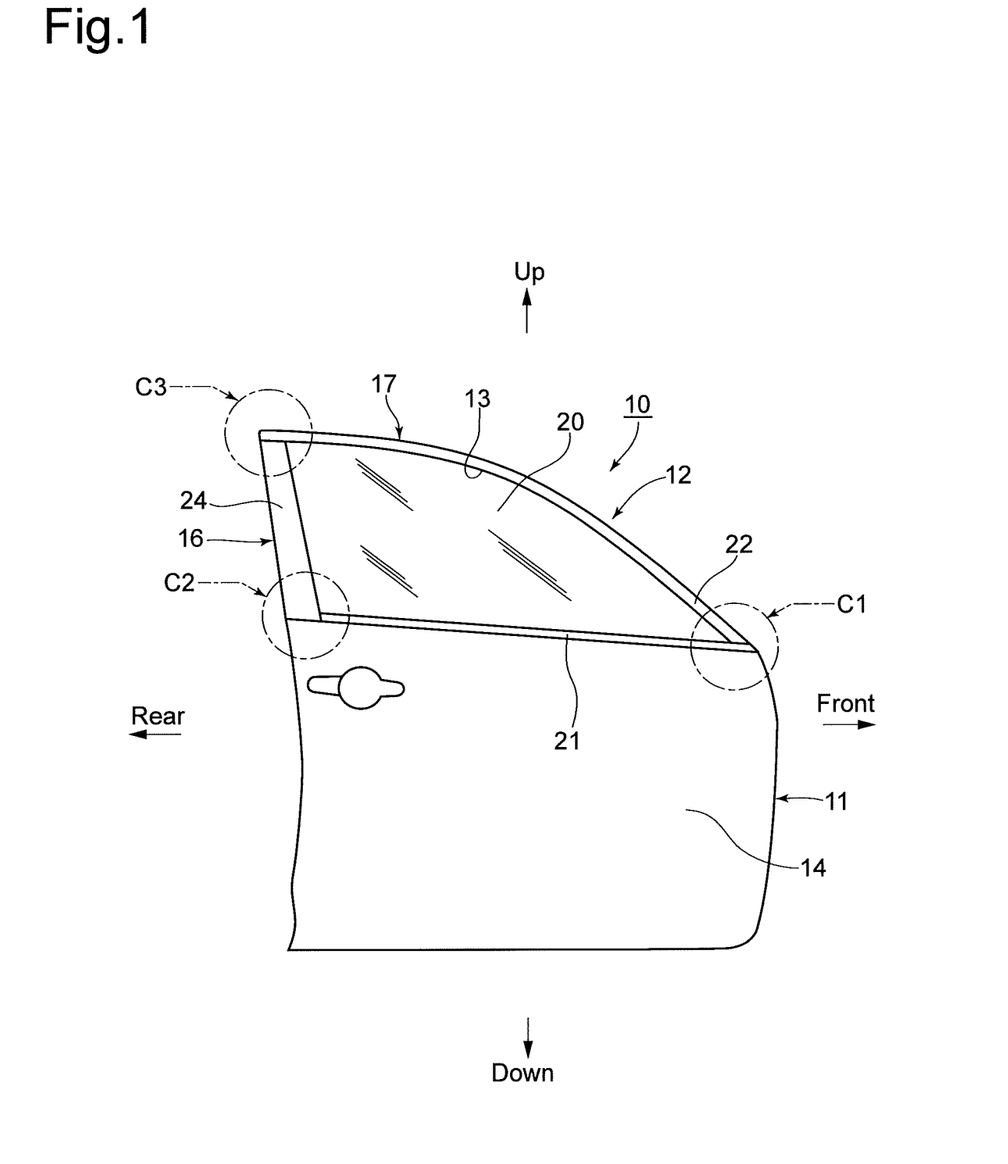
FIG. 1 is a side elevational view of a vehicle door for a front vehicle seat.

A first embodiment of an exterior structure of a vehicle door according to the present invention will be hereinafter discussed with reference to FIGS. 1 through 7. FIG. 1 shows a side door for a front vehicle seat (hereinafter after referred to as the door 10). The terms "vehicle forward and rearward directions", "vehicle upward and downward directions" and "vehicle interior and exterior directions" which will be mentioned in the following description to designate directions are defined with reference to each direction of the vehicle body, to which the door 10 is attached.

As shown in FIG. 1, the door 10 is provided with a door panel 11 and a door frame 12, and the space surrounded by the upper edge of the door panel 11 and the inner edge of the door frame 12 is provided as a window opening 13. The door panel 11 is configured of a combination of an outer panel 14 (see FIG. 3) which is positioned on the vehicle exterior side and an inner panel (not shown) which is positioned on the vehicle interior side. The door frame 12 is provided with an upright pillar sash 16 which is formed to extend upward from a portion of the door panel 11 in the vicinity of the rear end thereof and an upper sash 17 which is formed to extend forward from the upper end of the upright pillar sash 16. The upper sash 17 is connected to the door panel 11 at the front edge of the door 10. A door glass 20 moves up and down to close and open the window opening 13.

The door 10 is provided with exterior members that constitute the decorative appearance of the edge of the window opening 13. The door 10 is provided with a beltline molding (second exterior member/a body portion of the second exterior member) 21, a frame molding (first exterior member/a body portion of the first exterior member) 22 and a garnish molding 24 as the exterior members. The beltline molding 21 is attached to the upper edge of the door panel 11, the frame molding 22 is attached to the upper sash 17, and the garnish molding 24 is attached to the upright pillar sash 16. The beltline molding 21, the frame molding 22 and the garnish molding 24 are separately formed as long members and attached to the corresponding portions of the door 10.

As shown in FIG. 1, the door 10 is provided with door corner portions C1 and C2 at the two (front and rear) points: at which the door frame 12 is connected to the door panel 11, and is further provided with a door corner portion C3 at the point at which the upright pillar sash 16 and the upper sash 17, which constitute the door frame 12, are connected. At each of the three corner portions C1, C2 and C3, two exterior members (21 and 22, 22 and 24, or 22 and 24) are positioned to overlap each other as the door 10 is viewed from the vehicle external side.

At the door corner portion C1, a portion of the beltline molding 21 in the vicinity of the front end thereof and a portion of the frame molding 22 in the vicinity of the front end (lower end) thereof are overlaid on each other. At the door corner portion C2, a portion of the beltline molding 21 in the vicinity of the rear end thereof and a portion of the garnish molding 24 in the vicinity of the lower end thereof are overlaid on each other. At the door corner C3, a portion of the frame molding 22 in the vicinity of the rear end thereof and a portion of the garnish molding 24 in the vicinity of the upper end thereof are overlaid on each other. In the present embodiment, the overlapping portions of the beltline molding 21 and the frame molding 22 at the door corner portion C1 are configured according to the present invention and will be discussed in detail hereinafter.

Figure 3:
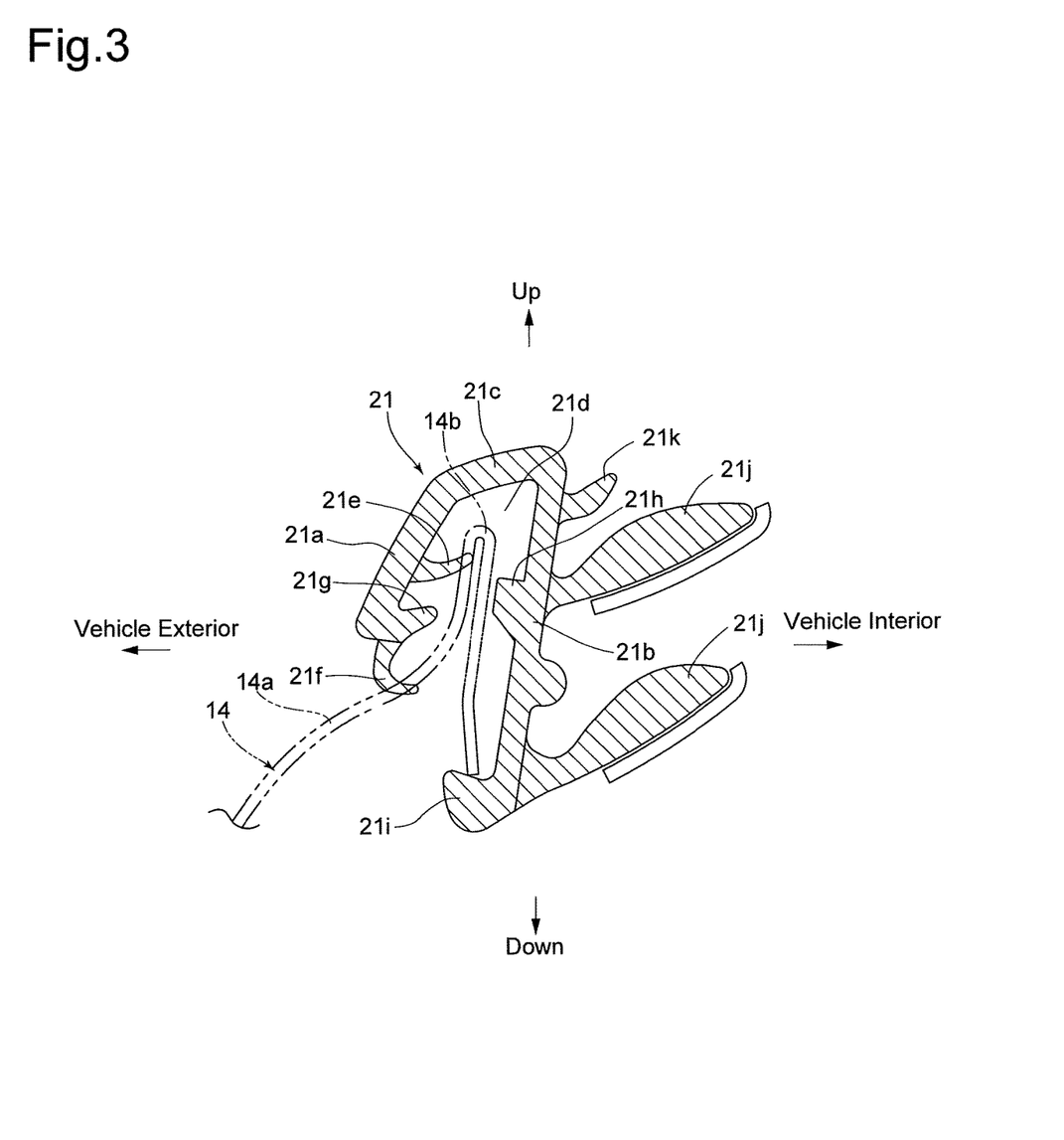
FIG. 3 is a cross-sectional view taken along the line shown in FIG. 2.

As shown in FIG. 3, the outer panel 14 is provided with an outer plate portion 14a and an attaching portion 14b. The outer plate portion 14a is positioned on the vehicle exterior side and constitutes the external surface of the door panel 11, while the attaching portion 14b has an inverted U-shape in cross section and is formed by folding the upper end of the outer plate portion 14a.

The beltline molding 21, which is a long member, is attached to the attaching portion 14b of the outer panel 14 to extend therealong. As shown in FIG. 3, the beltline molding 21 has an inverted U-shape in cross section that opens downward. More specifically, the beltline molding 21 is provided with a vehicle external side portion 21a which is positioned on the vehicle exterior side, a vehicle interior side portion 21b which is positioned on the vehicle interior side, and an upper-end connecting portion 21c which connects the upper edges of the vehicle external side portion 21a and the vehicle exterior side 21b. The beltline molding 21 is further provided with a groove-shaped portion 21d. The space surrounded by the vehicle external side portion 21a, the vehicle exterior side 21b and the upper-end connecting portion 21c is provided as the groove-shaped portion 21d.

Figure 6:
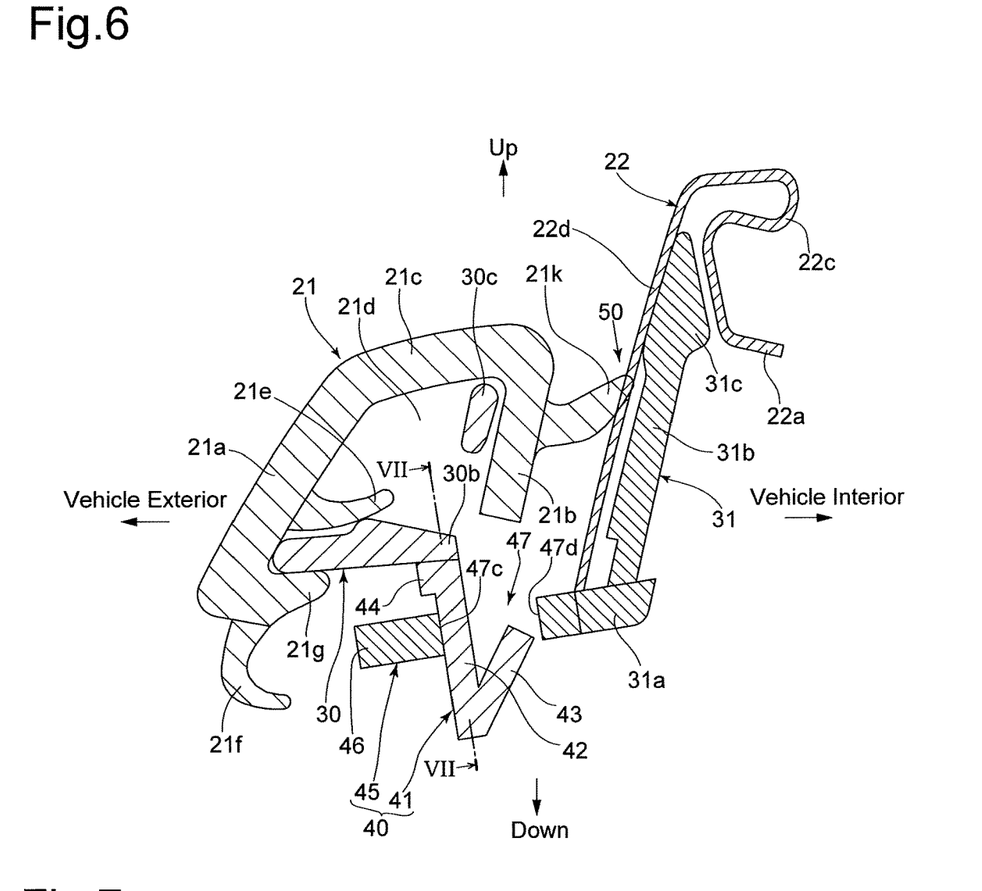
FIG. 6 is a cross-sectional view of the first embodiment of the vehicle door exterior structure, taken along the line VI-VI shown in FIG. 2.

The beltline molding 21 is provided with a body touch lip 21e which projects toward the vehicle interior side from the vehicle exterior side portion 21a and a body touch lip 21f which projects downward from the lower end of the vehicle exterior side portion 21a. The beltline molding 21 is provided, at a position between the body touch lips 21e and 21f in the vehicle upward and downward directions, with a support projection 21g which projects toward the vehicle interior side from the vehicle exterior side portion 21a. The beltline molding 21 is further provided with an anti-vibration projection 21h which projects toward the vehicle exterior side from the vehicle interior side portion 21b and a bent portion 21i which projects toward the vehicle exterior side from the lower end of the vehicle interior side portion 21b. The beltline molding 21 is further provided at different positions in the vehicle upward and downward directions with a pair of glass touch lips 21j and an anti-vibration projection 21k. The pair of glass touch lips 21j project toward the vehicle interior side from the vehicle interior side portion 21b, and the anti-vibration projection 21k is positioned above the pair of glass touch lips 21j and projects toward the vehicle interior side from the vehicle interior side portion 21b. The body touch lip 21e, the body touch lip 21f, the pair of glass touch lips 21j and the anti-vibration projection 21k are elastically deformable. FIGS. 3 and 6 show the shapes of the body touch lip 21e, the body touch lip 21f, the pair of glass touch lips 21j and the anti-vibration projection 21k in a free state.

As shown in FIG. 3, the beltline molding 21 is attached to the upper edge of the outer panel 14 (the door panel 11) with the attaching portion 14b inserted into the groove-shaped portion 21d. In this attached state, the end (lower end) of the inwardly folded portion of the attaching portion 14b, which is folded toward the vehicle interior side, is engaged with the bent portion 21i to prevent the beltline molding 21 from coming off upward. The body touch lip 21e and the body touch lip 21f respectively abut against the vehicle exterior side surface of the attaching portion 14b and the outer plate portion 14a while being elastically deformed, while the anti-vibration projection 21h is positioned to face the vehicle interior side surface of the attaching portion 14b. Accordingly, the position of the beltline molding 21 is determined with respect to the outer panel 14 in the vehicle interior and exterior directions. The body touch lip 21e and the body touch lip 21f prevent drops of water and foreign particles from entering the inside of the beltline molding 21 from outside. In addition, although not illustrated in FIG. 3, the glass touch lip 21j abuts against the door glass 20 (shown in FIG. 1) while being elastically deformed to prevent drops of water and foreign particles from entering the inside of the door panel 11. Additionally, the anti-vibration projection 21k faces the door glass 20 to prevent the door glass 20 from vibrating toward the vehicle external side. The beltline molding 21 that has been attached as described above covers the vehicle exterior side surface, the vehicle interior side surface and the top of the attaching portion 14b to constitute the appearance of the upper edge of the door panel 11.

The beltline molding 21 can be made of an arbitrary material. For instance, the beltline molding 21 can be entirely made of synthetic resin. In this case, elastically deformable portions of the beltline molding 21 such as each lip 21e, 21f and 21j and the anti-vibration projection 21k can be made of a synthetic resin smaller in hardness than the other part of the beltline molding 21. Additionally, the beltline molding 21 can also be configured of a combination of a metal and a synthetic resin.

Figure 2:
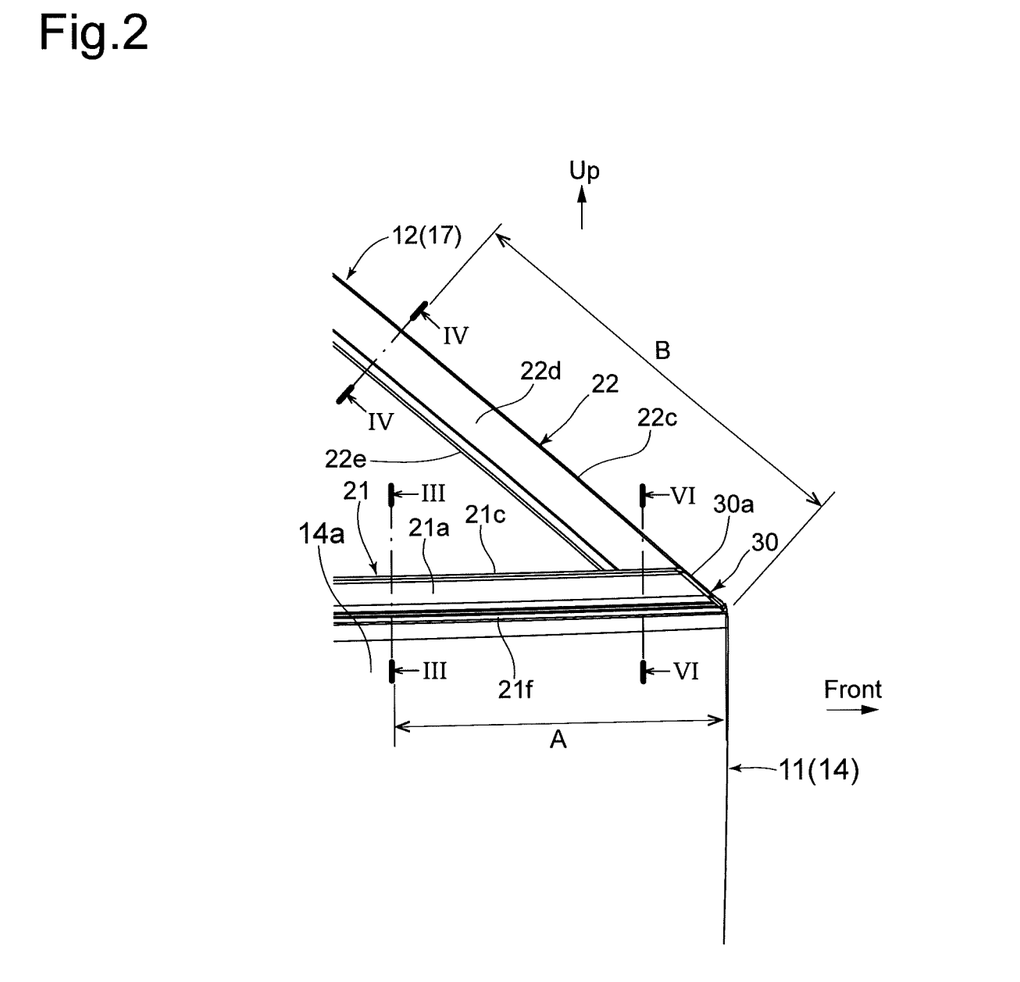
FIG. 2 is an enlarged side elevational view of a portion of the door shown in FIG. 1 which includes a front door corner.
Figure 5:
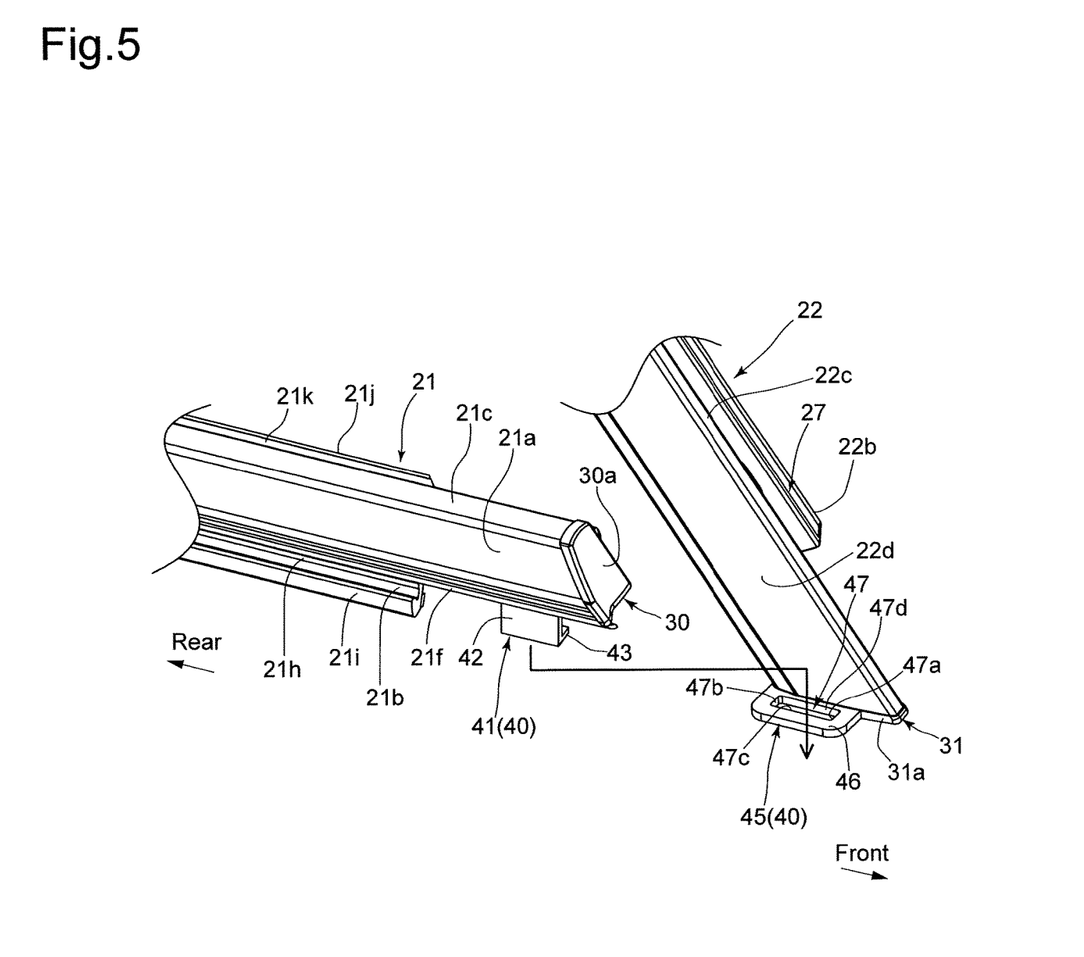
FIG. 5 is an exploded perspective view of a frame molding and a beltline molding in a first embodiment of a vehicle door exterior structure.

As shown in FIG. 2, a predetermined section of the beltline molding 21 which ranges from the end (front end) thereof in the elongated direction of the beltline molding 21 (i.e., in the vehicle forward and rearward directions) is provided as a non-engaging section A which is not directly engaged with the door body (the door panel 11 and the door frame 12). The remaining portion of the beltline molding 21, which extends rearward from the rear end of the non-engaging section A, is supported by the door panel 11 (the outer panel 14) via the above-illustrated cross-sectional structure shown in FIG. 3. On the other hand, as shown in FIG. 6, the attaching portion 14b is not inserted into the groove-shaped portion 21d of the beltline molding 21 in the range of the non-engaging section A, and therefore, the beltline molding 21 is in a state where a gap exists between the non-engaging section A and the door body (the door panel 11 and the door frame 12). As shown in FIGS. 5 and 6, the lower part of the vehicle interior side portion 21b is partly removed from the non-engaging section A of the beltline molding 21; thereby, neither the anti-vibration projection 21h nor the bent portion 21i is formed in the non-engaging section A.

An end cap (second exterior member) 30 is fitted to the front end of the body portion of the beltline molding 21. The end cap 30 is provided with a lid portion 30a (see FIG. 5) and insertion portions 30b and 30c (see FIG. 6) which project from the lid portion 30a. The lid portion 30a can be in contact with the end surface of the beltline molding 21 that faces forward (obliquely upwardly forward), and the insertion portions 30b and 30c are oriented so as to extend rearward from the lid portion 30a to be inserted into the groove-shaped portion 21d of the beltline molding 21. The positions of the insertion portions 30b and 30c are determined by the insertion portions 30b and 30c being press-fitted into the groove-shaped portion 21d. As the cross-sectional position shown in FIG. 6, part of the insertion portion 30b is positioned in a recess formed between body touch lip 21e and the support projection 21g and is held therebetween, while the insertion portion 30c is in contact with the inner side of the beltline molding 21 at the boundary between the vehicle internal side portion 21b and the upper-end connecting portion 21c, which prevents the end cap 30 from moving in the vehicle interior and exterior directions and the vehicle upward and downward directions relative to the beltline molding 21. In addition, the end cap 30 is also prevented from moving in the vehicle forward and rearward directions relative to the beltline molding 21 by the press-fit of the insertion portions 30b and 30c into the groove-shaped portion 21d.

Figure 4:
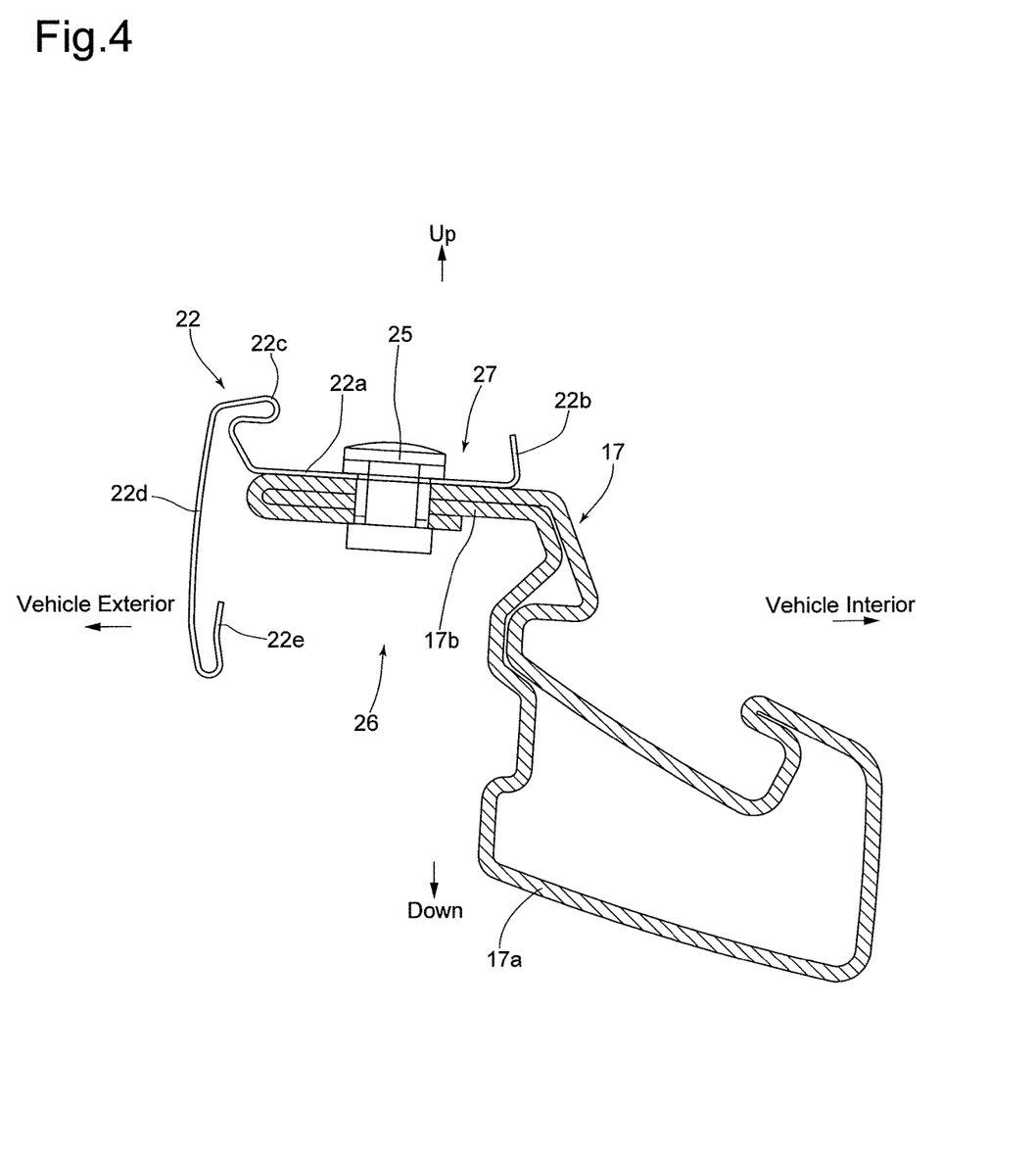
FIG. 4 is a cross-sectional view taken along the line IV-IV shown in FIG. 2.

As shown in FIG. 4, the upper sash 17 is provided with a vehicle interior-side frame portion 17a and a vehicle exterior-side extension portion 17b. The vehicle interior-side frame portion 17a is positioned on the vehicle interior side and has a closed cross-sectional shape. The vehicle exterior-side extension portion 17b extends toward the vehicle exterior side from the vehicle interior-side frame portion 17a.

The frame molding 22, which is a long member, is attached to the vehicle exterior-side extension portion 17b of the upper sash 17 to extend therealong. As shown in FIG. 4, the frame molding 22 is provided with a bottom plate portion 22a, a vehicle interior side retaining portion 22b, a vehicle exterior side retaining portion 22c, a design portion 22d and a folded portion 22e. The bottom plate portion 22a is overlaid on the upper surface of the vehicle exterior extension portion 17b. The vehicle interior side retaining portion 22b is formed to be continuous with the vehicle interior side end of the bottom plate portion 22a. The vehicle exterior side retaining portion 22c is formed to be continuous with the vehicle exterior side end of the bottom plate portion 22a. The design portion 22d extends downward from the vehicle exterior side retaining portion 22c. The folded portion 22e is formed by folding the lower end of the design portion 22d toward the vehicle interior side.

As shown in FIG. 4, the bottom plate portion 22a and the vehicle exterior extension portion 17b are overlaid on each other in the vehicle upward and downward directions and fastened to each other by a set of screws (a set screw and a closed back screw post) 25. As a fastener which fastens the frame molding 22 and the upper sash 17 to each other, any other fastener such as a rivet, a weld rivet, etc. can be used instead. Additionally, instead of using these partial fasteners, the bottom plate portion 22a and the vehicle exterior extension portion 17b can be continuously fixed to each other by laser welding or the like. The frame molding 22 attached as described above constitutes the appearance of the upper sash 17 with the design portion 22d positioned on the vehicle exterior side of the vehicle interior-side frame portion 17a.

In addition, attaching the frame molding 22 to the upper sash 17 causes a holding recess 26 and a holding recess 27 to be formed. The holding recess 26 is surrounded by the vehicle interior-side frame portion 17a, the vehicle external extension portion 17b and the design portion 22b and opens downward. The holding recess 27 is surrounded by the bottom portion 22a, the interior side retaining portion 22b and the vehicle exterior side retaining portion 22c and opens upward. A glass run (not shown) made of an elastic material is inserted into the holding recess 26, and a weather strip (not shown) made of an elastic material is inserted into the holding recess 27. The glass run holds an edge of the door glass 20 (see FIG. 1). The weather strip abuts against the door opening edge (not shown) of the vehicle body and is elastically deformed to seal the gap between the door 10 and the vehicle body when the door 10 is closed.

The frame molding 22 can be made of an arbitrary material. For instance, the frame molding 22 can be formed of a metal sheet. Additionally, the frame molding 22 can also be formed of a metal plate and a synthetic resin which covers the outside of the metal plate or formed solely of a synthetic resin with no use of a metal plate.

As shown in FIG. 2, a predetermined section of the frame molding 22 which ranges from the end (front end) thereof in the elongated direction of the frame molding 22 is provided as a non-engaging section B which is not directly engaged with the door body (the door panel 11 and the door frame 12). The remaining portion of the frame molding 22, which extends rearward from the rear end of non-engaging section B, is supported by the door frame 12 (the upper sash 17) via the above-illustrated cross-sectional structure shown in FIG. 4. On the other hand, as shown in FIGS. 5 and 6, in the non-engaging section B of the frame molding 22, neither a major part of the bottom plate 22a nor the vehicle interior-side holding portion 22b is formed, and the frame molding 22 is in a state where a gap exists between the frame molding 22 and the door body (the door panel 11 and the door frame 12). FIG. 6 shows a cross section taken at an angle at which the cross section does not pass through the folded portion 22e; however, the folded portion 22e, together with the vehicle exterior side retaining portion 22c and the design portion 22d, is continuously formed up to the front end of the frame molding 22. Accordingly, in the non-engaging section B, the vehicle exterior side retaining portion 22c, the design portion 22d and the folded portion 22e constitute the non-engaging section B of the frame molding 22.

An end cap (first exterior member) 31 is fitted to the front end of the body portion of the frame molding 22. The end cap 31 is provided with a lid portion 31a (see FIG. 5) and an insertion portion 31b (see FIG. 6) which obliquely projects from the lid portion 31a. The lid portion 31a can be in contact with the end surface of the frame molding 22 that faces downward, and the insertion portion 31b is oriented so as to extend obliquely upward from the lid portion 31a to be inserted into the design portion 22d along the vehicle interior side surface thereof. The upper edge of the insertion portion 31b is formed into a wedge-shaped portion 31c which is inserted in between the design portion 22d and the vehicle exterior-side holding portion 22c. Although not shown in FIG. 6, the lower edge of the insertion portion 31b is inserted in a groove (see FIG. 4) formed between the design portion 22d and the folded portion 22e. The above described upper and lower edges of the insertion portion 31b are each press-fitted into place, which prevents the end cap 31 from moving relative to the frame molding 22 in both the vehicle interior and exterior directions and the vehicle upward and downward directions and also in the longitudinal direction of the frame molding 22.

As shown in FIGS. 2, 5 and 6, at the door corner portion C1, the beltline molding 21 and the frame molding 22 are disposed to overlap each other in the vehicle interior and exterior directions. The beltline molding 21 and the frame molding 22 are positioned in that order in the direction from the vehicle exterior side to the vehicle interior side with the vehicle interior side portion 21b and the design portion 22d facing each other in the vehicle interior and exterior directions.

Unlike the portion having the general cross-sectional structure shown in FIGS. 3 and 4, the door corner portion C1 is included in the non-engaging section A (FIG. 2), via which the beltline molding 21 is not directly supported by the door panel 11 (the outer panel 14), and the non-engaging section B (FIG. 2), via which the frame molding 22 is not directly supported by the door frame 12 (the upper sash 17). Therefore, at the door corner portion C1, there is a possibility of the beltline molding 21 and the frame molding 22 moving relative to the door body. Specifically, the non-engaging section B of the frame molding 22 is greater in length than the non-engaging section A of the beltline molding 21; hence, this configuration tends to cause the frame molding 22 to move (deviate from the original position) at the door corner portion C1.

In the non-engaging section A, the direction in which the beltline molding 21 may possibly move is subject to the cross sectional structure of the beltline molding 21 itself and the support structure of the door panel 11 other than the non-engaging section A; hence, it is sometimes the case that there exit both a direction in which the beltline molding 21 easily moves and a direction in the beltline molding 21 does not easily move. Likewise, in the non-engaging section B, the direction in which the frame molding 22 may possibly move is subject to the cross sectional structure of the frame molding 22 itself and the support structure of the door frame 12 other than the non-engaging section B; hence, it is sometimes the case that there exit both a direction in which the frame molding 22 easily moves and a direction in the frame molding 22 does not easily move.

Therefore, movements (deviations) of the non-engaging section A of the beltline molding 21 and the non-engaging section B of the frame molding 22 are not limited solely to unbounded movements (deviations) in all directions; each of the non-engaging section A of the beltline molding 21 and the non-engaging section B of the frame molding 22 can move (deviate from the original position) only in a specific direction(s). For instance, as for the beltline molding 21, upward movement of the bent portion 21i is limited by engagement of the bent portion 21i with the end of the attaching portion 14b of the outer panel 14 in the general cross-sectional portion shown in FIG. 3, and accordingly, a substantial upward displacement of the bent portion 21i is less likely to occur also in the non-engaging section A. Additionally, as shown in FIG. 3, in the general cross-sectional portion shown in FIG. 3, engagement of the anti-vibration projection 21h, which is a hard projection provided on the vehicle interior side portion 21b, with the attaching portion 14b of the outer panel 14 enhances restrictions on movement of the beltline molding 21 toward the vehicle exterior side; accordingly, a displacement of the beltline molding 21 toward the vehicle exterior side is less likely to occur also in the non-engaging section A.

To stabilize the positions of the beltline molding 21 and the frame molding 22 at the door corner C1, there is provided an alignment portion for relative positioning between the beltline molding 21 and the frame molding 22. This alignment portion is provided with a first alignment portion (first mating portion) 40 and a second alignment portion (second mating portion) 50 (see FIG. 6).

The first alignment portion 40 is provided with a downward projecting portion 41 and a side extension portion 45 which are formed integral with the end cap 30 and the end cap 31 and provided on the beltline molding 21 side and the frame molding 22 side, respectively.

As shown in FIGS. 5 and 6, the downward projecting portion 41, provided as a portion of the end cap 30, is shaped into a cantilevered projection that includes a plate-shaped portion 42 and a bent portion 43. The plate-shaped portion 42 projects downward from the vehicle internal side end of the insertion portion 30b of the end cap 30, and the bent portion 43 extends obliquely upward toward the vehicle interior side from the lower end of the plate-shaped portion 42. The plate-shaped portion 42 is provided at the base end thereof with a base-end stepped portion 44 which is positioned on the vehicle exterior side of the plate-shaped portion 42 and projects downward by an amount of projection smaller than the amount of downward projection of the plate-shaped portion 42. The downward projecting portion 41 is formed to extend in the vehicle forward and rearward directions while maintaining the cross sectional shape shown in FIG. 6.

As shown in FIGS. 5 and 6, the side extension portion 45, provided as a portion of the end cap 31, is provided with a plate-shaped portion 46 which is formed to make the lid portion 31a of the end cap 31 extend toward the vehicle exterior side and an insertion hole 47 which is formed to extend through the plate-shaped portion 46 in the vehicle upward and downward directions. The plate-shaped portion 46 projects farther toward the vehicle exterior side than the design portion 22d of the frame molding 22. The insertion hole 47 is a rectangular elongated hole the long-side direction (elongated direction) of which extends in the vehicle forward and rearward directions and the short-side direction of which extends in the vehicle interior and exterior directions. The side extension portion 45 is provided in the insertion hole 47 with a front end surface 47a and a rear end surface 47b (shown in FIGS. 5 and 7) as inner surfaces of the insertion hole 47 which are spaced from each other and face each other in the vehicle forward and rearward directions. The side extension portion 45 is further provided in the insertion hole 47 with a side surface 47c and a side surface 47d (shown in FIGS. 5 and 6) as inner surfaces of the insertion hole 47 which are spaced from each and face each other in the vehicle interior and exterior directions.

Figure 7:
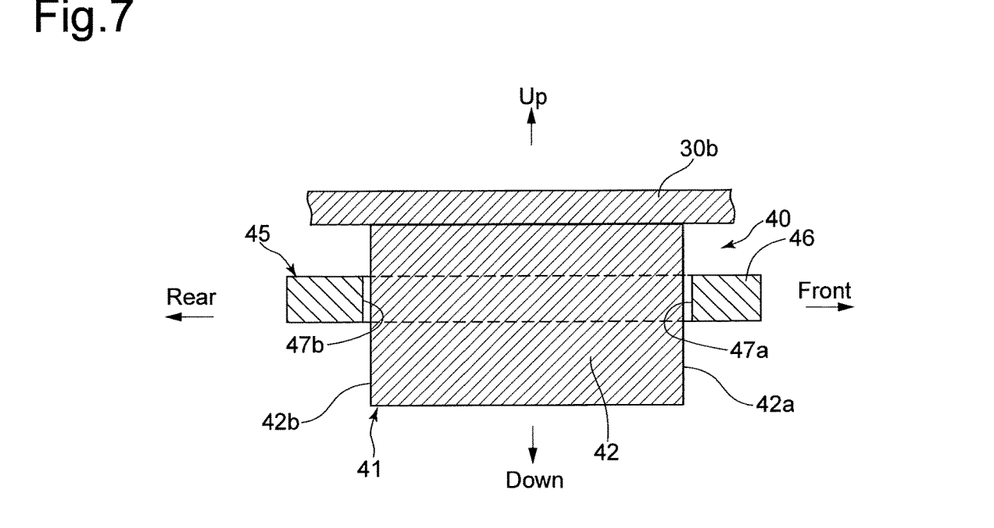
FIG. 7 is a cross sectional view taken along the line VII-VII shown in FIG. 6.

The length of the insertion hole 47 in the vehicle forward and rearward directions (which corresponds to the distance between the front end surface 47a and the rear end surface 47b) is slightly greater than the length of the downward projecting portion 41 in the vehicle forward and rearward directions (see FIG. 7). The width of the insertion hole 47 in the vehicle interior and exterior directions is slightly greater than the sum of the width of the plate-shaped portion 42 and the width of the bent portion 43 of the downward projecting portion 41 in the same directions (see FIG. 6).

As shown in FIGS. 5 and 6, the downward projecting portion 41 and the side extension portion 45 are mated with each other by inserting the plate-shaped portion 42 and the bent portion 43 into the insertion hole 47. As shown in FIG. 6, the engagement of the side surface 47c of the insertion hole 47 with the plate-shaped portion 42 prevents the frame molding 22 from moving toward the vehicle interior side relative to the beltline molding 21. In the engaged state shown in FIG. 6, a portion of the bent portion 43 in the vicinity of the upper end thereof is positioned close to the side surface 47d of the side extension portion 45.

The second alignment portion 50 is configured from a portion of the anti-vibration projection 21k of the beltline molding 21 and a portion of the design portion 22d of the frame molding 22 which abut against each other. As shown in FIG. 6, the anti-vibration projection 21k, which projects from the vehicle interior side portion 21b of the beltline molding 21, abuts against the vehicle exterior side surface of the design portion 22d. This abutment of the anti-vibration projection 21k against the design portion 22d causes the anti-vibration projection 21k to be pressed and resiliently deformed toward the vehicle exterior side, and the resiliency of the anti-vibration projection 21k thus deformed causes the frame molding 22 to be pressed toward the vehicle interior side with respect to the beltline molding 21. When the frame molding 22 is pressed toward the vehicle interior side, the side surface 47c of the insertion hole 47 is pressed against the plate-shaped portion 42.

As described above, the first alignment portion 40 restricts the position of the frame molding 22 toward the vehicle exterior side with respect to the beltline molding 21, while the second alignment portion 50 restricts the position of the frame molding 22 toward the vehicle interior side with respect to the beltline molding 21. Since the beltline molding 21 and the frame molding 22 interact with each other to restrict the positions thereof in the vehicle interior and exterior directions, the beltline molding 21 and the frame molding 22 can be stabilized by being well mated with each other in the vehicle interior and exterior directions even at the door corner portion C1, at which a gap exists between each of the beltline molding 21 and the frame molding 22 and the door body (the door panel 11 and the door frame 12).

In particular, in the second alignment portion 50, by the anti-vibration projection 21k resiliently abutting against the design portion 22d, the contact portion between the plate-shaped portion 42 and the side surface 47c of the first alignment portion 40 can be used as a positional reference. Therefore, the position of the frame molding 22 relative to the beltline molding 21 in the vehicle interior and exterior directions can be determined with high precision while absorbing accuracy errors between the parts with a clearance secured between the downward projecting portion 41 and the insertion hole 47 in the vehicle interior and exterior directions.

In the first alignment portion 40, the plate-shaped portion 42 abuts against the side surface 47c, which is one of the pair of side surfaces 47c and 47d of the insertion hole 47 which is positioned farther from the body portion of the frame molding 22 (i.e., closer to the vehicle exterior side) than the other side surface. Providing a reference for alignment between the beltline molding 21 and the frame molding 22 at a position away from the body portion of the frame molding 22 as described above makes the frame molding 22 less likely to tilt, thus making the vehicle door exterior structure at the door corner portion C1 excellent in stability.

Additionally, as described above, the beltline molding 21 has a characteristic such that a displacement of the beltline molding 21 toward the vehicle exterior side is less likely to occur also in the non-engaging section A due to the engagement between the anti-vibration projection 21h and the attaching portion 14b of the outer panel 14 in the general cross-sectional portion shown in FIG. 3. Accordingly, in the first alignment portion 40, alignment of the beltline molding 21 with the frame molding 22 in the vehicle interior and exterior directions can be achieved with high precision by using the vehicle exterior side surface of the plate-shaped portion 42 of the beltline molding 21 as a positional reference with respect to the side surface 47c of the insertion hole 47 of the frame molding 22 (i.e., by making the side surface 47c of the insertion hole 47 abut against the plate-shaped portion 42) (see FIG. 6).

The downward projecting portion 41, which constitutes a portion of the first alignment portion 40, has increased in strength by the formation of the bent portion 43 in addition to the plate-shaped portion 42, which serves as a positional reference in the vehicle interior and exterior directions. As can be seen from FIG. 6, vibrations of the frame molding 22 in the vehicle external side direction are limited by the anti-vibration projection 21k; however, for instance, in the case where a great force is instantaneously exerted on the frame molding 22, the side surface 47d, which is positioned on the frame molding 22 side, comes closer to and engages with the bent portion 43, which is positioned on the beltline molding 21 side; this engagement between the side surface 47d and the bent portion 43 can also limit vibrations of the frame molding 22. The bent portion 43 absorbs shock and vibration while being deformed in the vehicle external side direction with the connected portion between the bent portion 43 and the plate-shaped portion 42 serving as a point of support. Since the bent portion 43 has an inclined shape which approaches the plate-shaped portion 42 in the downward direction, there is no risk of the bent portion 43 being accidentally caught by the upper surface of the side extension portion 45 and thereby deteriorating workability when the downward projecting portion 41 is inserted into the insertion hole 47 during assembly.

Additionally, in the first alignment portion 40, the lower surface of the base-end stepped portion 44 of the downward projecting portion 41 and the upper surface of the plate-shaped portion 46 of the side extension portion 45 face each other in the vehicle upward and downward directions as shown in FIG. 6. These mutually facing portions of the plate-shaped portion 46 and the base-end stepped portion 44 can limit upward movement of the frame molding 22 relative to the beltline molding 21.

In design, a predetermined gap is secured between the base-end stepped portion 44 and the plate-shaped portion 46 in the vehicle upward and downward directions as shown in FIG. 6, and this gap makes it possible to absorb accuracy errors in the vehicle upward and downward directions. In the second alignment portion 50, due to the inclined shapes of the anti-vibration projection 21k and the design portion 22d with respect to the vehicle upward and downward directions, the resiliency of the anti-vibration projection 21k which is resiliently deformed acts on the design portion 22d in not only the vehicle interior side direction as noted above but also the downward direction. With this downward component force, the position of the frame molding 22 in the vehicle upward and downward directions is stabilized in the state shown in FIG. 6 (in a state where a gap exists between the base-end stepped portion 44 and the plate-shaped portion 46). Further, in the case where the frame molding 22 deviates upward from the position thereof shown in FIG. 6, the plate-shaped portion 46 comes into contact with the base-end stepped portion 44 to thereupon be prevented from further deviating upward.

In addition, as described above, the beltline molding 21 has a characteristic such that a displacement of the beltline molding 21 in the upward direction is less likely to occur in the non-engaging section A due to the engagement between the bent portion 21i and the attaching portion 14b of the outer panel 14 in the general cross-sectional portion shown in FIG. 3. Accordingly, in the first alignment portion 40, the effect of limiting upward movement of the frame molding 22 is enhanced by making the beltline molding 21 and the frame molding 22 have a relationship such that the plate-shaped portion 46 of the frame molding 22 can come into contact with the base-end stepped portion 44 of the beltline molding 21 from below (see FIG. 6).

Additionally, in the first alignment portion 40, the front end surface 42a and the rear end surface 42b of the plate-shaped portion 42 of the downward projecting portion 41 face the front end surface 47a and the rear end surface 47b of the insertion hole 47, respectively, as shown in FIG. 7, and the relative movement between the beltline molding 21 and the frame molding 22 in the vehicle forward and rearward directions is limited by engagement between the front end surface 42a and the front end surface 47a and engagement between the rear end surface 42b and the rear end surface 47b.

For instance, even when the beltline molding 21 and the garnish molding 24 are brought into alignment in the vehicle forward and rearward directions at the door corner C2, it is possible to bring the beltline molding 21 into alignment with the frame molding 22 in the vehicle forward and rearward directions independently via the first alignment portion 40 at the door corner portion C1, at which the opposite end of the beltline molding 21 is positioned, which achieves an excellent alignment accuracy in the vehicle forward and rearward directions.

As shown in FIG. 7, a predetermined clearance is secured between the front end surface 42a of the downward projecting portion 41 and the front end surface 47a of the insertion hole 47 in the vehicle forward and rearward directions and between the rear end surface 42b of the downward projecting portion 41 and the rear end surface 47b of the insertion hole 47 in the vehicle forward and rearward directions. These clearances make it possible to absorb accuracy errors between the beltline molding 21 and the frame molding 22 in the vehicle forward and rearward directions. Specifically, when the beltline molding 21 is brought to be aligned with both the frame molding 22 and the garnish molding 24 in the vehicle forward and rearward directions at the door corner portions C1 and C2, respectively, the accuracy error between the beltline molding 21 and the frame molding 22 at the door corner portion C1 and the accuracy error between the beltline molding 21 and the garnish molding 24 at the door corner portion C2 can both be absorbed on the door corner C1 side.

However, to enhance the reliability of the positioning of the beltline molding 21 and the frame molding 22 in the vehicle forward and rearward directions at the door corner portion C1, it is also possible to form no clearance between the front end surfaces 42a and 47a and between the rear end surfaces 42b and 47b in the vehicle forward and rearward directions. In this case, each of the following two embodiments is possible: an embodiment in which no clearance is provided between the downward projecting portion 41 and the insertion hole 47 at both the front side (where the front end surfaces 42a and 47a are provided) and the rear side (where the rear end surfaces 42b and 47b are provided) and an embodiment in which no clearance is provided between the downward projecting portion 41 and the insertion hole 47 at either one of the front and rear sides.

In the alignment operation by the first alignment portion 40 and the second alignment portion 50 at the door corner C1, the frame molding 22, which includes the non-engaging section B that is greater in length than the non-engaging section A, is attached to the upper sash 17 with the beltline molding 21, which includes the non-engaging section A that is smaller in length than the non-engaging section B, used as a reference. Accordingly, the alignment for the frame molding 22, which is in an easy-to-move condition relative to the door body, is performed with reference to the beltline molding 21, which is in a hard-to-move condition relative to the door body. Consequently, high-accuracy alignment can be achieved by effectively utilizing the difference in support condition between the beltline molding 21 and the frame molding 22.

Subsequently, a second embodiment of the exterior structure of the vehicle door according to the present invention will be hereinafter discussed with reference to FIGS. 8 through 10. In the second embodiment of the exterior structure of the vehicle door, parts and portions similar to those in the first embodiment are designated by the same reference numerals, and the detailed descriptions thereof are omitted herein.

More specifically, the second embodiment of the exterior structure of the vehicle door is identical in structure to the first embodiment of the exterior structure of the vehicle door except the structure of a first alignment portion (first mating portion) 60 which is provided at the door corner portion C1. In the second embodiment of the exterior structure of the vehicle door, the first alignment portion 60 is provided on the beltline molding 21 side with a downward projecting portion 61 and provided on the frame molding 22 side with a side extension portion 65.

The downward projecting portion 61 is provided as a portion of the end cap 30, which is fitted to the front end of the beltline molding 21. The downward projecting portion 61 projects downward from the vehicle interior side end of an insertion portion 30*d* of the end cap 30 which is inserted into the groove-shaped portion 21*d*. The downward projecting portion 61 is provided with a plate-shaped portion 62 and a base-end stepped portion 63 which is positioned on the vehicle external side of the plate-shaped portion 62 and smaller in downward projecting amount than the plate-shaped portion 62. The downward projecting portion 61 is formed to extend in the vehicle forward and rearward directions while maintaining the cross sectional shape shown in FIG. 9.

The side extension portion 65 is provided as a portion of the end cap 31, which is fitted to the front end (lower end) of the frame molding 22. The side extension portion 65 is provided with a plate-shaped portion 66 which is formed to make the lid portion 31*a* of the end cap 31 extend toward the vehicle exterior side. The side extension portion 65 is further provided with a side upright wall 67, a front upright wall 68 and a rear upright wall 69 all of which project upward from the plate-shaped portion 66. The plate-shaped portion 66 is substantially rectangular in shape as viewed from above, and the long side and the short side of the plate-shaped portion 66 are oriented to extend along the vehicle forward and rearward directions and the vehicle interior and exterior directions, respectively. The side upright wall 67 extends in the vehicle forward and rearward directions along the vehicle exterior side edge of the plate portion 66. The front upright wall 68 extends in the vehicle interior and exterior directions along the front edge of the plate-shaped portion 66. The rear upright wall 69 extends in the vehicle interior and exterior directions along the rear edge of the plate-shaped portion 66. The front upright wall 68 and the rear upright wall 69 are substantially parallel to each other. In addition, the side upright wall 67, the front upright wall 68 and the rear upright wall 69 are substantially identical in upward projecting amount (height) from the plate-shaped portion 66.

Figure 8:
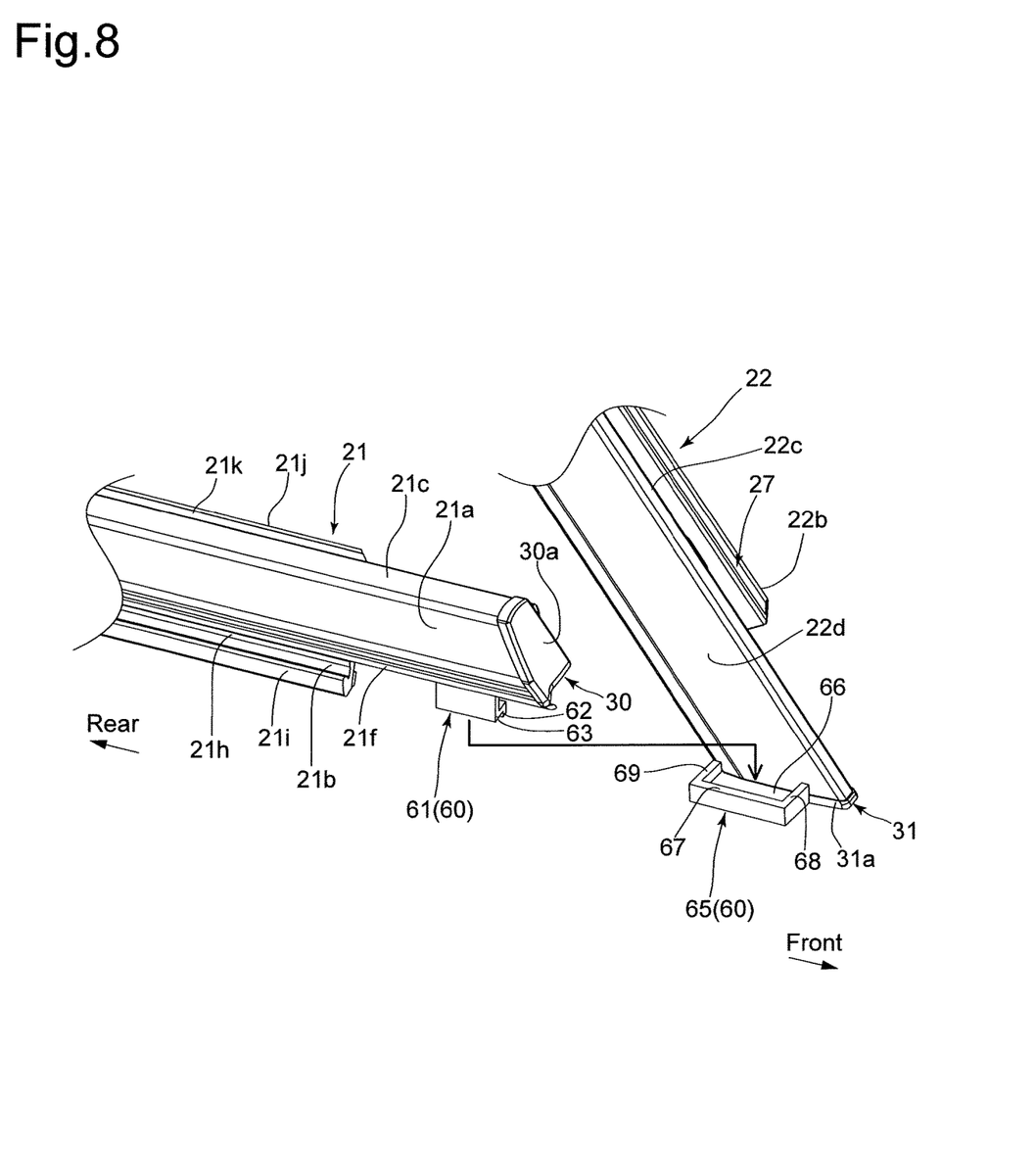
FIG. 8 is an exploded perspective view of a frame molding and a beltline molding in a second embodiment of the vehicle door exterior structure.
Figure 9:
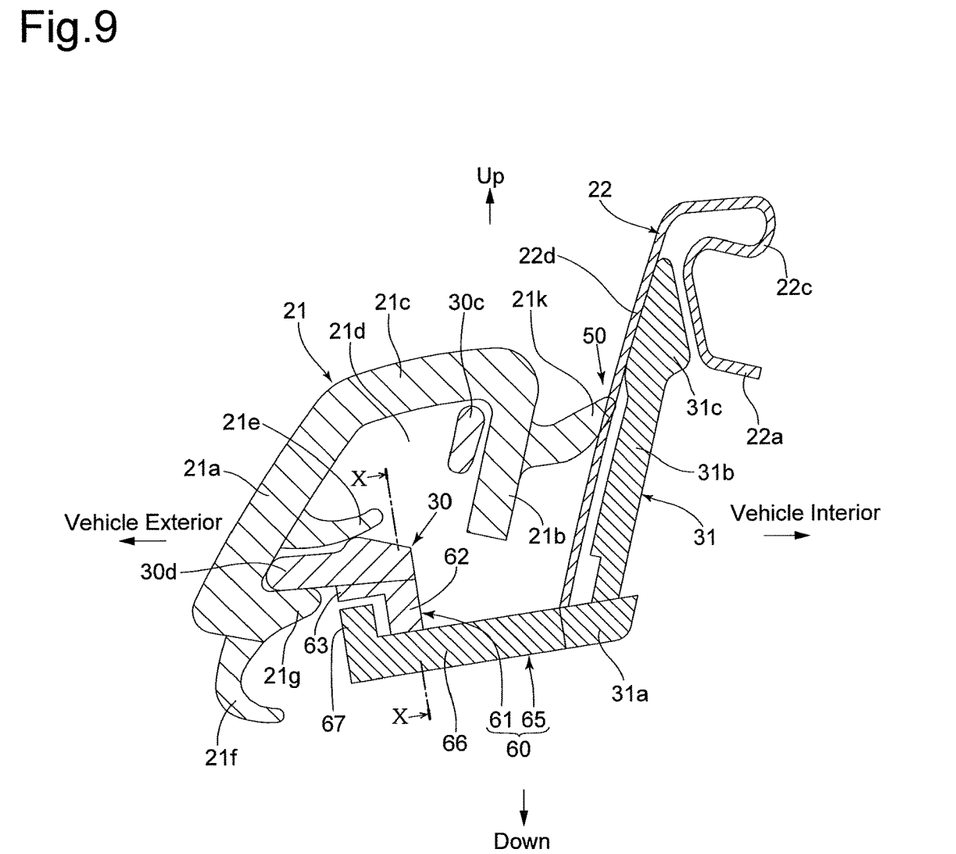
FIG. 9 is a cross-sectional view of the second embodiment of the vehicle door exterior structure, taken along the line VI-VI shown in FIG. 2.

As shown in FIGS. 8 and 9, the downward projecting portion 61 and the side extension portion 65 are mated with each other by inserting the plate-shaped portion 62 into a recessed portion which is surrounded by the side upright wall 67, the front upright wall 68 and the rear upright wall 69 with the plate-shaped portion 66 serving as the bottom of this recessed portion. In this mated state, the plate-shaped portion 62 and the side upright wall 67, which are provided on the beltline molding 21 side and the frame molding 22 side, respectively, are positioned to face each other in the vehicle interior and exterior directions. The engagement of the side upright wall 67 with the plate-shaped portion 62 prevents the frame molding 22 from moving toward the vehicle interior side relative to the beltline molding 21. Accordingly, similar to the above described first embodiment of the exterior structure of the vehicle door, the beltline molding 21 and the frame molding 22 can be brought into alignment in the vehicle interior and exterior directions by the alignment portion that consists of the first alignment portion 60 and the second alignment portion 50.

Additionally, in the first alignment portion 60, the lower end surface of the plate-shaped portion 62 of the downward projecting portion 61 and the upper surface of the plate-shaped portion 66 of the side extension portion 45 face each other in the vehicle upward and downward directions as shown in FIG. 9. The engagement between these mutually facing surfaces of the plate-shaped portion 62 and the plate-shaped portion 66 prevents the frame molding 22 from moving upward relative to the beltline molding 21.

The second embodiment of the exterior structure of the vehicle door can be modified such that a clearance is provided between the plate-shaped portion 62 and the plate-shaped portion 66 in the vehicle upward and downward directions so that upward movement of the frame molding 22 relative to the beltline molding 21 can be limited by engagement between mutually facing surfaces of the base-end stepped portion 63 and the side upright wall 67.

Figure 10:
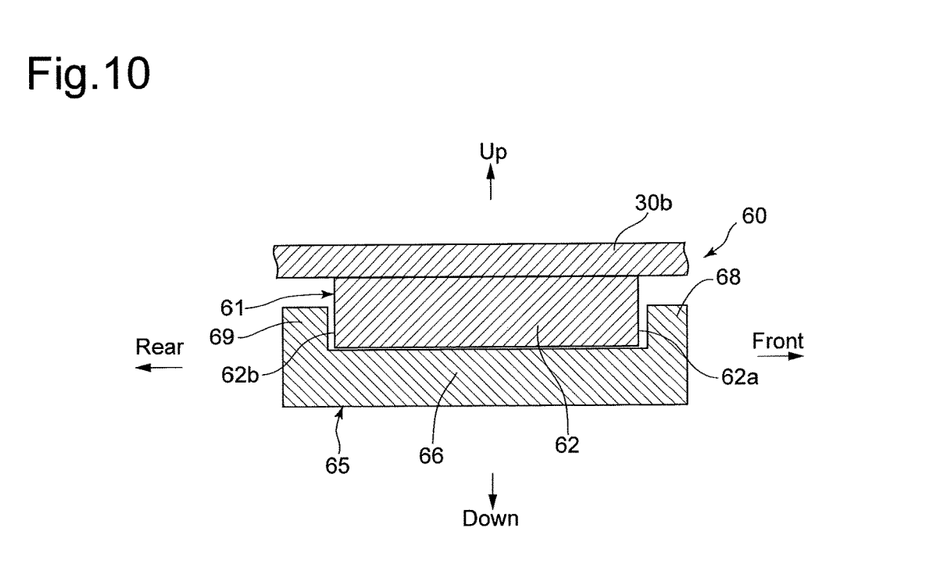
FIG. 10 is a cross sectional view taken along the line X-X shown in FIG. 9.

Additionally, in the first alignment portion 60, the front end surface 62*a* and the rear end surface 62*b* of the plate-shaped portion 62 of the downward projecting portion 61 face the front upright portion 68 and the rear upright portion 69, respectively, as shown in FIG. 10, and the relative movement between the beltline molding 21 and the frame molding 22 in the vehicle forward and rearward directions is limited by engagement between the front end surface 62*a* and the front upright wall 68 and engagement between the rear end surface 62*b* and the rear upright wall 69.

Similar to the first embodiment, it is possible to align the beltline molding 21 and the frame molding 22 with each other in the vehicle forward and rearward directions via the first alignment portion 60 at the door corner portion C1 while aligning the beltline molding 21 and the garnish molding 24 with each other in the vehicle forward and rearward directions at the door corner C2, which achieves an excellent alignment accuracy in the vehicle forward and rearward directions.

As shown in FIG. 10, a predetermined clearance is secured between the front end surface 62*a* of the downward projecting portion 61 and the front upright wall 68 in the vehicle forward and rearward directions and between the rear end surface 62*b* of the downward projecting portion 61 and the rear upright wall 69 in the vehicle forward and rearward directions. With these clearances, when, e.g., the beltline molding 21 is brought into alignment with both the frame molding 22 and the garnish molding 24 at the door corner portions C1 and C2, respectively, the accuracy error between the beltline molding 21 and the frame molding 22 at the door corner portion C1 and the accuracy error between the beltline molding 21 and the garnish molding 24 at the door corner portion C2 can both be absorbed on the door corner C1 side.

However, to enhance the reliability of the positioning of the beltline molding 21 and the frame molding 22 in the vehicle forward and rearward directions at the door corner portion C1, it is also possible to form no clearance between the downward projecting portion 61 and the side extension portion 45 in the vehicle forward and rearward directions at both or either of the front side (where the front end surface 62*a* and the front upright wall 68 are provided) and the rear side (where the rear end surfaces 62*b* and the rear upright wall 69 are provided).

As with each embodiment described above, the first exterior member, which is composed of a combination of the frame molding 22 and the end cap 31, and the second exterior member, which is composed of a combination of the beltline molding 21 and the end cap 30, are provided with an alignment portion (the first alignment portion 40 or 60 and the second alignment portion 50) for mutual alignment at the door corner C1. Because the first exterior member and the second exterior member are brought into alignment with each other by themselves, variations in the relative positions between the first exterior member and the second exterior member can be reduced to achieve satisfactory appearance also at the door corner portion C1, where the mounting of each exterior member to the door body (the door panel 11 and the door frame 12) is restricted. In addition, aligning the first exterior member and the second exterior member with each other makes it possible to prevent the beltline molding 21 and the frame molding 22 from fluttering and causing noise at the door corner portion C1.

For instance, in the case where the first alignment portion 40 or 60 is not provided, there is a possibility of that misalignment between the beltline molding 21 and the frame molding 22 in the vehicle interior and exterior directions which may cause the design portion 22d of the frame molding 22 to be disengaged from the anti-vibration projection 21k of the beltline molding 21 occurring. If the anti-vibration projection 21k and the design portion 22d are disengaged from each other to thereby create a gap therebetween, there is a possibility of air turbulence occurring between the beltline molding 21 and the frame molding 22 and thereupon noise occurring at the time of traveling; further, there is a possibility of portions of the beltline molding 21 and the frame molding 22 in the vicinity of the front ends thereof vibrating and fluttering in the vehicle interior and exterior directions by wind pressure at the time of traveling. Additionally, there is also a possibility of a different in level of each of the vehicle interior side portion 21b and the upper-end connecting portion 21c relative to the design portion 22d in the vehicle interior and exterior directions increasing to thereby deteriorate the appearance of the overlapping portions of the beltline molding 21 and the frame molding 22. The problems as described above can be prevented by stabilizing the positional relationship between the beltline molding 21 and the frame molding 22 in the vehicle interior and exterior directions by providing the first alignment portion 40 or 60.

Additionally, in the case where the first alignment portion 40 or 60 is not provided, there is also a possibility of misalignment between the beltline molding 21 and the frame molding 22 in the vehicle forward and rearward directions occurring. As shown in FIG. 2, the front end of the beltline molding 21 (the lid portion 30a of the end cap 30) and the upper edge of the design portion 22d of the frame molding 22 are configured to be continuous and flush with each other as the door corner portion C1 is viewed from the vehicle exterior side. Assuming that the beltline molding 21 and the frame molding 22 are misaligned in the vehicle forward and rearward directions, there is a possibility of the appearance of the overlapping portions of the exterior members deteriorating by, e.g., the front end of the beltline molding 21 (the lid portion 30a of the end cap 30) jutting forward from the design portion 22d of the frame molding 22. Additionally, at the time of traveling, there is a possibility of outside air entering the inside of the beltline molding 21 and the frame molding 22 through the gap in the vehicle forward and rearward directions, which may become a cause of noise, vibrations, etc. The problems as described above can be prevented by stabilizing the positional relationship between the beltline molding 21 and the frame molding 22 in the vehicle forward and rearward directions by providing the first alignment portion 40 or 60.

Further, in the first alignment portion 40 or 60 in each of the above described first and second embodiments, alignment in the vehicle upward and downward directions is also performed to stabilize the positional relationship between the beltline molding 21 and the frame molding 22 in the vehicle upward and downward directions. Specifically, upward movement of the frame molding 22 in the upward direction with respect to the beltline molding 21 is restricted.

The first alignment portion 40 or 60 in each of the above described first and second embodiments is provided on the end cap 30 and the end cap 31, which are fitted to ends of the beltline molding 21 and the frame molding 22, respectively. Accordingly, each first alignment portion 40 and 60 can be obtained with no modifications made to the beltline molding 21 and the frame molding 22, each of which is a long member. The downward projecting portion 41 and the side extension portion 45 each have a shape that can be easily molded in the manufacturing process of the end caps 30 and 31, respectively; likewise, the downward projecting portion 61 and the side extension portion 65 each have a shape that can be easily molded in the manufacturing process of the end caps 30 and 31, respectively, which makes it possible to obtain the above described effects with a configuration superior in productivity and production cost. The end caps 30 and 31 can each be formed of an arbitrary material; as an example, the joint strength in each first alignment portion 40 and 60 can be ensured by forming each end cap 30 and 31 of a hard synthetic resin.

Although the present invention has been described based on the above illustrated embodiments, the present invention is not limited solely to these particular embodiments; various modifications to the above illustrated embodiment of the seat reclining apparatus are possible without departing from the gist of the present invention. For instance, although each of the above illustrated embodiments has been configured for alignment of the beltline molding 21 and the frame molding 22 at the door corner C1, the present invention can also be applied to the door corner portion C2 for alignment of the beltline molding 21 and the garnish molding 24 at the door corner portion C2 and also to the door corner portion C3 for alignment for the frame molding 22 and the garnish molding 24 at the door corner portion C3.

The present invention is applicable also to the case where two exterior members overlap each other or are coupled to each other at a position other than any door corner portion.

In each of the above described first and second embodiments, alignment is performed in the vehicle interior and exterior directions, the vehicle upward and downward directions and the vehicle forward and rearward directions in the first alignment portion 40 or 60; accordingly, reliable alignment has been achieved with a space-saving configuration. However, unlike the above illustrated embodiments, portions for alignment in different directions can be provided (as different portions) independently of one another.

There are the advantages described above in providing the end caps with an alignment portion; however, an alignment portion can also be provided on the body portions of moldings such as the beltline molding 21 and the frame molding 22. As an example, in each cross section shown in FIGS. 6 and 9, by modifying the shape of the frame molding 22 in such a manner as to make the lower end of the design portion 22d of the frame molding 22 inserted into the groove-shaped portion 21d of the beltline molding 21 by folding the lower end of the design portion 22d of the frame molding 22 toward the vehicle exterior side, the beltline molding 21 and the frame molding 22 can be brought into alignment in the vehicle interior and exterior directions via the folded end of the design portion 22d and the vehicle interior side portion 21b, which are provided on the frame molding 22 side and the beltline molding 21 side, respectively.

Although alignment in the vehicle interior and exterior directions is performed using both the first alignment portion 40 or 60 and the second alignment portion 50 in each of the above described first and second embodiments, alignment in the vehicle interior and exterior directions can also be performed with a single integrated alignment portion. For instance, if the downward projecting portion 61 is further provided, at a position on the vehicle exterior side of the side upright wall 67, with a second plate-shaped portion by modifying the cross sectional shape of the downward projecting portion 61 shown in FIG. 9, it is possible to limit the relative movement between the beltline molding 21 and the frame molding 22 in both the vehicle interior side direction and the vehicle exterior side direction by positioning the side upright wall 67 between the plate-shaped portion 62 and the second plate-shaped portion.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An exterior structure of a vehicle door, comprising:
a first exterior member and a second exterior member which are attached to said vehicle door and overlap each other as viewed from a vehicle exterior side, said first exterior member creating a clearance between said vehicle door and a portion of said first exterior member which overlaps said second exterior member; and
an alignment portion which determines a position of said first exterior member in vehicle interior and exterior directions with respect to said second exterior member, said alignment portion being provided at said overlapping portions between said first exterior member and said second exterior member,
wherein said alignment portion comprises a first mating portion and a second mating portion which limit said position of said first exterior member in one and an other of said vehicle interior and exterior directions, respectively,
wherein said first exterior member comprises a body portion and an end cap which covers an end surface of said body portion,
wherein said end cap comprises: a lid portion which comes in contact with said end surface of said body portion; and an insertion portion which projects from said lid portion and is inserted into said body portion, and
wherein said first mating portion comprises an extension portion which extends from said lid portion in said vehicle external side direction to face said second exterior member in said vehicle interior and exterior directions.

2. The exterior structure of the vehicle door according to claim 1,
wherein said alignment portion further determines a position of said first exterior member relative to said second exterior member in vehicle upward and downward directions.

3. The exterior structure of the vehicle door according to claim 1,
wherein, at said second mating portion, one of said first exterior member and said second exterior member resiliently abuts against an other of said first exterior member and said second exterior member.

4. The exterior structure of the vehicle door according to claim 1,
wherein, said extension portion of said first exterior member is provided with an insertion hole which extends through said extension portion in vehicle upward and downward directions,
wherein said second exterior member comprises a body portion and an end cap which covers an end surface of said body portion of said second exterior member,
wherein said end cap of said second exterior member is provided with a downward projecting portion which projects downward, and
wherein said downward projecting portion is inserted in said insertion hole.

5. The exterior structure of the vehicle door according to claim 1,
wherein, said extension portion of said first exterior member is provided with an upright wall which projects upward,
wherein said second exterior member comprises a body portion and an end cap which covers an end surface of said body portion of said second exterior member,
wherein said end cap of said second exterior member is provided with a downward projecting portion which projects downward, and
wherein said downward projecting portion and said upright wall are positioned to face each other in said vehicle interior and exterior directions.

6. An exterior structure of a vehicle door, comprising:
a plurality of exterior members which are attached to said vehicle door; and
an alignment portion which determines a position of one of said exterior members in vehicle interior and exterior directions with respect to an other of said exterior members,
wherein said plurality of said exterior members comprises a first exterior member and a second exterior member,
wherein said first exterior member comprises a first body portion and a first end cap which covers an end surface of said first body portion,
wherein said second exterior member comprises a second body portion and a second end cap which covers an end surface of said second body portion,
wherein said first end cap comprises a first lid portion which comes in contact with said end surface of said first body portion, and a first insertion portion which projects from said first lid portion and is inserted into said first body portion,
wherein said second end cap, which is provided as a discrete member from said first end cap, comprises a second lid portion which comes in contact with said end surface of said second body portion, and a second insertion portion which projects from said second lid portion and is inserted into said second body portion, and
wherein said first end cap and said second end cap comprise said alignment portion.

7. The exterior structure of the vehicle door according to claim 6, wherein said exterior members are overlapped with each other.

* * * * *